United States Patent [19]

Maxham

[11] Patent Number: 4,983,258
[45] Date of Patent: Jan. 8, 1991

[54] CONVERSION OF PULP AND PAPER MILL WASTE SOLIDS TO PAPERMAKING PULP

[75] Inventor: John V. Maxham, Appleton, Wis.

[73] Assignee: Prime Fiber Corporation, Appleton, Wis.

[21] Appl. No.: 251,761

[22] Filed: Oct. 3, 1988

[51] Int. Cl.$^5$ .......................... D21C 11/00; D21F 1/66
[52] U.S. Cl. ..................................... 162/189; 162/190; 162/191; 162/DIG. 9; 210/631; 210/712; 210/787; 210/806; 210/928
[58] Field of Search ................. 162/4, 5, 189, 190, 162/191, DIG. 9; 210/928, 787, 806, 631, 712

[56] References Cited

U.S. PATENT DOCUMENTS

| | | | |
|---|---|---|---|
| 3,740,363 | 6/1973 | Fuller | 210/609 |
| 3,833,468 | 9/1974 | Boniface | 162/189 X |
| 3,849,245 | 11/1974 | Marsh et al. | 162/189 X |
| 4,332,638 | 6/1982 | Mauer et al. | 162/4 |
| 4,334,984 | 6/1982 | Vagac et al. | 162/4 X |
| 4,360,402 | 11/1982 | Ortner et al. | 162/29 X |
| 4,738,750 | 4/1988 | Ackel | 210/928 X |

Primary Examiner—Peter Chin
Assistant Examiner—Thi Dang
Attorney, Agent, or Firm—Andrus, Sceales, Starke & Sawall

[57] ABSTRACT

A process for the production of papermaking fiber or pulp from waste solids emanating from pulp and paper mills, particularly waste solids in process water streams containing fibrous solids that cannot be directly recycled by paper mill "saveall" devices, from pulp and paper mill process water streams conveyed by the sewerage system to wastewater treatment plant facilities, and from "sludge" emanating from the underflow of a primary clarifier or sedimentation basin at pulp and paper mill wastewater treatment facilities either before or after the "sludge" is thickened and dewatered. The said process comprises a defibering stage to release individual fibers from bundles, a screening stage to separate long fiber and debris from short fiber and clay, a centrifugal cleaning stage to separate debris from the long fiber, a bleaching stage to increase the brightness of the fiber, a dewatering stage to remove excess water from the pulp, a sedimentation stage to separate the short fiber-clay-debris from the defibering effluent which is substantially recycled, and a biological treatment process to remove dissolved organic materials from the excess water generated which can be either discharged from the process or recycled as process water. The said process produces a papermaking fiber or pulp from waste pulp and paper mill waste solids that is substantially the same quality as the papermaking fiber or pulp used by the pulp and paper mill producing the waste solids.

8 Claims, 1 Drawing Sheet

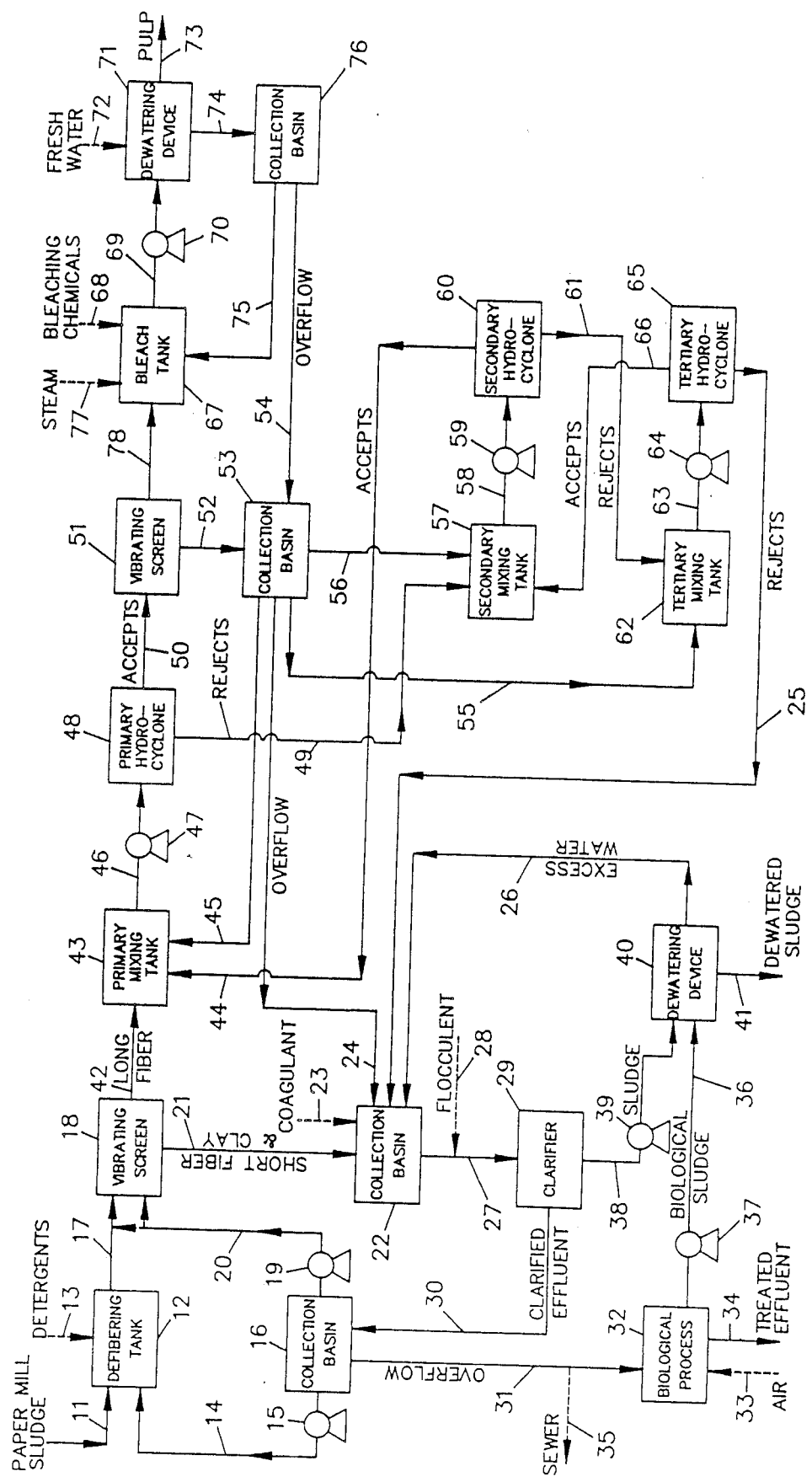

CONVERSION OF PULP AND PAPER MILL WASTE SOLIDS TO PAPERMAKING PULP

BACKGROUND OF THE INVENTION

1. Field of the Invention

This invention relates to a process converting pulp and paper mill waste solids into a papermaking fibrous pulp of substantially the same quality as used by the pulp and paper mill to make its paper products.

2. State of the Art

The manufacture of paper involves the blending of pulp (mainly wood fiber) with clay filler, retention aids such as alum, and other chemicals as deemed desirable, and running the slurry on a paper machine to form a sheet that is dewatered and dried. In this process, fiber and filler escape. Many mills empoly "saveall" devices including polydisc filters, gravity drum filters, vacuum filters, dissolved air flotation cells, and sedimentation basins that capture to some degree the fiber and filler. These solids are then directly recycled.

Despite the presence of "saveall" devices in the paper mill, discharge of fiber and clay from the paper machine area is unavoidable due to leaks, mistakes in operation, or dumping of batches to make grade or color changes on a paper machine. These solids are discharged as a slurry to the sewerage system of the paper mill. The paper mill sewerage system can either discharge to the sewerage system of a municipality or terminate at the paper mill's own wastewater treatment facilities.

In a paper mill wastewater treatment facility, the wastewater would first enter a sedimentation basin or clarifier (called the primary sedimentation basin or clarifier) or in some instances a dissolved air flotation device that captures suspended material (substantially fiber and clay contaminated with random debris) with or without the aid of coagulants or flocculants. The suspended material then forms a concentrated slurry containing normally 1% to 5% solids. This slurry or "sludge" is then pumped to a gravity thickener (if required to further concentrate the suspension) and then to a dewatering device (most normally a belt filter press, vacuum filter, or screw press) that increases sludge solids content normally in the range of 20% to 50%.

Many wastewater treatment facilities also have an aerobic biological treatment process such as the activated sludge process that generates a biological sludge upon further treatment of the wastewater to remove dissolved biodegradable organic materials called BOD. Mills that make both pulp from wood and paper from the pulp produced (called integrated facilities) will have wastewater containing waste solids from the pulp mill. The pulp mill wastewater may or may not be segregated from the paper mill wastewater. If not, pulp mill solids will be present in the sludge from the primary clarifier.

Therefore differentiation is made between paper mill sludge solids, pulp mill sludge solids, and biological treatment sludge solids. The invention herein described is most useful in relationship to paper mill sludge solids but will also apply to pulp mill sludge solids that contain appreciable quantities of wood fiber. It is advantageous to not mix biological treatment plant sludge solids and non-fibrous pulp mill sludge solids with the pulp and paper mill wastewater fibrous solids. If paper mill, pulp mill, and biological solids are mixed together, the process described by this invention will be successfully applied but the expense and difficulty of processing will be greater than if biological sludge solids and non-fibrous pulp solids were not incorporated with the pulp and paper mill fibrous sludge solids.

The main components of paper mill waste solids are wood fiber and clay contaminated with amounts of random debris. The type of fiber contained in the waste solids is substantially the same as the fiber contained in the pulp used by the mill to make its paper products. However, the waste solids fiber will be inferior compared to the papermaking pulp fiber with respect to fiber length, strength and other physical properties. This fact, along with a high percentage of clay and random debris contained in the waste solids in comparison to the papermaking fiber, makes the waste solids not suitable to be directly recycled. Furthermore, the fiber may contain dyes that make it unsuitable for making certain grades of paper.

Specifically, the sludge fiber contains more fiber fines and clay than the pulp used to make paper. Nevertheless the sludge will contain a substantial portion of long fiber that will be of a quality substantially the same as the fiber used by the mill to make paper provided it can be separated from the fiber fines, clay and other debris contained in the sludge.

In this regard it should be mentioned that fiber emanating from a mill that uses primarily virgin pulps to make paper will likely have a higher % of long fiber in its sludge solids compared to a mill that uses waste paper as its primary source of raw pulp. Waste paper also contains appreciable amounts of clay filler or coating pigments that invariably end up in the wastewater emanating from a paper mill.

Paper mills usually dispose of their sludge in a landfill where they must pay the cost of transportation of the sludge to the landfill and are charged a disposal or tipping fee. Some paper mills dispose of the sludge by landspreading where they must pay the cost of transportation to the landspread site, pay a user fee or purchase land, and spread the material.

A few pulp and paper mills incinerate sludge in dedicated facilities or include it in fuel for existing power boilers. However, the capital cost for dedicated facilities are high and the fuel value of many sludges is low due to high ash and water contents and low heating value of the fiber itself. The steam generated by power boilers has a low intrinsic value.

Others have suggested that the sludge be converted into useful by-products. Conversion of paper mill sludges into valuable by-products is taught, for example, by U.S. Pat. No. 4,481,072 where paper mill sludge is treated with alkali then dewatered. The filtrate is used to prepare white liquor in the Kraft pulping process and the solids added to furnishes used in the manufacture of paperboard and fiberboard.

U.S. Pat. No. 3,876,497 teaches a process of wet oxidation of a sludge to generate energy and recover a clay product useful as a paper making filler.

U.S. Pat. No. 4,356,060 teaches a method of heating the sludge to evaporate water and convert to granules. The granules are then milled and forced through a screen. The product can be used as insulating material or filler in pipe insulation, roofing material, or similar products.

U.S. Pat. No. 4,221,751 teaches a method of molding an article such as a pallet from paper mill sludge.

U.S. Pat. No. 4,285,842 teaches a method for producing a fibrous fire protection agent from sludge.

U.S. Pat. Nos. 3,907,728 and 3,909,470 teach a method of making plywood adhesives extended with paper mill fines.

The invention described differs in that it it teaches a method of separation of high quality fiber from paper mill sludge and the cleaning and bleaching of that fiber such that it can be directly recycled. Therefore, though all the above inventions relate to conversion of paper mill sludge to useful by-products, none are directed at direct conversion of sludge solids into a pulp that can be directly recycled or alternatively used by another paper mill that uses a similar quality pulp to make its paper products.

SUMMARY OF THE INVENTION

It is the object of this invention to provide an efficient and economical method for the separation of the long fiber pulp fraction contained in pulp and paper mill waste solids from other waste solids and conversion of the long fiber pulp fraction into a pulp that can be utilized directly by the paper mill generating the waste solids to make paper products, or utilized by some other paper mill that uses a pulp to make paper products similar to the mill generating the waste solids.

It is a further object of the invention to process waste pulp and paper mill solids in a manner to eliminate to the highest practical extent the pumping of water by use of gravity flow whenever possible.

It is still a further object of the invention to process the waste paper mill solids in a manner where excess water emanating from particular unit operations within the process invention, flow countercurrently to the processing of waste paper mill solids in order to reuse process water to the highest practical extent. There is provided a biological treatment process in a particular mode of operation that process the total excess water from the process invention to remove biodegradable organic material to make the excess water safe for discharge to the aquatic environment or to be further recycled as process water. If the effluent is further recycled as process water, the present invention will either have no discharge of excess water to the aquatic environment or a very small discharge with the amount of discharge dependent on the water content of the incoming waste solids to the process invention.

In accordance with the present invention, the waste paper mill solids are carried into the process as a very dilute slurry as in a wastewater discharge, or as a concentrated slurry or "sludge" as emanates from the underflow of a sedimentation basin or clarifier or the float from a dissolved air flotation unit, or as a dewatered material as produced by a dewatering device as a belt press, screw press, vacuum filter, polydisc vacuum filter, or gravity drum filter.

The first processing step would be to defiber the waste solids which releases individual fibers from fiber bundles. This processing step is essential when a dewatered sludge is handled. This processing step may or may not be necessary when a sludge is handled from the underflow of a sedimentation basin or clarifier or dissolved air flotation unit. This processing step is normally not necessary when handling a wastewater. The defibered waste solids are then processed by a vibrating screen that separates the long fiber (plus large debris) that is retained on the screen from the short fiber and clay that passes through the screen. The short fiber and clay is then concentrated by a sedimentation (or flotation) process after addition of coagulants and flocculants to aid in the sedimentation (or flotation) process. The thickened short fiber-clay-debris slurry is then dewatered on a belt press, screw press, or vacuum filter.

The long fiber fraction is cleaned of debris using centrifugal cleaners known as hydrocyclones. The rejected debris is added to the short fiber-clay fraction. The cleaned long fiber is then dewatered on a vibrating screen and sent to a bleach tank where bleaching chemicals and steam are added to aid in the bleaching process. This processing step is necessary to remove color from the long fiber and to increase its brightness. The bleached pulp is then sent to a dewatering device to remove water for ease in transportation. Alternatively, the pulp can be directly recycled in slurry form.

BRIEF DESCRIPTION OF THE DRAWING

The invention is illustrated in the accompanying drawing wherein the single FIGURE is a flow diagram of a particular mode of operation of the pulp and paper mill sludge conversion process of the present invention.

DETAILED DESCRIPTION OF THE INVENTION

Referring now to the drawing in detail, raw paper mill sludge is introduced by means of line 11 into a defibering tank 12 equipped with a mixing device that will disperse the fibers. Dilution water is added (if necessary) via line 14 from clarifier effluent collection basin 16 motivated by pump 15. The consistency of the sludge in the defibering tank would normally be in the range of 2 to 5% solids if the raw sludge is obtained from the underflow of a primary clarifier. If dewatered raw sludge is added where the pulp consistency is normally above 20% solids, dilution water can be added to lower the consistency.

The advantage in defibering at a high consistency is to to reduce energy consumption and the size of the defibering vessel. The purpose of the defibering stage is to release individual pulp fibers from bundles. This process is aided by the addition of detergent chemicals via line 13. Laundry detergents, sodium hydroxide, sodium oleate, and sodium silicate are chemicals that can be added to aid in defibering.

The pulp slurry is carried by line 17 onto vibrating screen 18. The purpose of the vibrating screen is to separate the long fiber (plus large debris) from the short fiber (fiber fines) and clay. The vibrating screen contains a screen with mesh size in the range of 10 to 400 mesh. The selection of screen mesh size depends on the amount of short fiber it is desirable to include in the pulp. The smaller the screen openings, the more short fiber and clay will be retained and the less the hydraulic loading can be exerted per square foot of screen surface area. Other screening devices such as a "sidehill" screen may be substituted for a vibrating screen.

The fiber retained on the screen is washed by water carried by line 20 from the clarifier water storage tank 16 motivated by pump 19. The water is applied onto the vibrating screen by nozzles mounted on top of the screen. This method reduces the amount of water applied to the vibrating screen. Alternatively, the wash water can be added directly to the concentrated pulp slurry carried by line 17 and then applied to vibrating screen 18.

The vibrating screen 18 underflow, containing primarily short fiber and clay, is carried via line 21 to the collection basin 22 equipped with a mixing device. A coagulant is added via line 23 to collection basin 22 to allow the short fiber and clay to form a settleable mass of solids.

Additional water streams enter collection basin 22. One stream is carried via line 24 from collection basin 53 and is the overflow from that basin. Another stream is carried via line 25 from tertiary hydrocyclone 65 and contains rejects from that device. The rejects are mainly fiber and high specific gravity debris. This material aids in the settling and dewatering of the short fiber and clay suspension formed in collection basin 23. Another stream is carried via line 26 from dewatering device 40 and is the water removed when the short fiber-clay-debris sludge is dewatered.

The flow is then carried via line 27 to clarifier or sedimentation basin 29. Flocculants are injected into line 27 via line 28 to allow the short fiber-clay-debris suspension to reach particle sizes large enough to allow the material to settle at a rapid rate. The short fiber-clay-debris mixture settles to the bottom of the clarifier and the clarified effluent, substantially free of short fiber-clay-debris then is carried by line 30 to the clarified water storage basin 16. The clarified water is then recycled to the defibering tank 12 and vibrating screen 18. In this manner, the water used in defibering is substantially recycled.

Excess water, overflows from clarified water collection basin 16 via line 31 to an aerobic biological treatment process 32. There the excess water is treated to remove dissolved organic materials generating a biological sludge. Air is added via line 33 to supply oxygen for respiration of the biological organisms.

The biological sludge is separated from the treated effluent via gravity sedimentation within the biological treatment process 32. The treated effluent is carried from biological process 32 via line 34. The treated effluent is substantially free of oxygen demanding organic substances and suspended materials. It is therefore normally safe to discharge to an aquatic environment. Alternatively, the overflow from collection basin 16 can be discharged directly to a sewer via line 35 where it can be treated in wastewater treatment facilities at the paper mill or in municipal facilities or other facilities as provided.

The excess biological sludge is carried via line 36 motivated by pump 37 into a sludge dewatering device 40, preferably a belt press or screw press or vacuum filter. There it is mixed with the short fiber-clay-debris sludge carried via line 38 motivated by pump 39 from clarifier 29. Dewatered sludge is carried via line 41 from dewatering device 40. This material can be disposed of by landfill or landspread or composted or possibly incinerated. Excess water is carried via line 26 back to collection basin 22.

The processing up to this point has the purpose of removing short fiber and clay from the long fiber in paper mill sludge. The long fiber is carried via line 42 from vibrating screen 18 to mixing tank 43 equipped with a mixing device. The mixing intensity in mixing tank 43 is normally not as intense as in defibering tank 12 since the fiber enters in slurry form and has already been substantially defibered.

Two other streams enter primary mixing tank 43. One stream is carried via line 44 from secondary hydrocyclone 60 and represents the accepted fiber from that device. The second stream is carried via line 45 and comes from collection basin 53 which accepts the underflow from vibrating screen 51. These streams dilute the substantially dewatered long fiber suspension carried via line 42 from vibrating screen 18.

The contents of mixing tank 43 is carried via line 46 motivated by pump 47 into a primary hydrocyclone 48 which imparts a centrifugal force to the slurry causing debris of specific weight greater than that of water to be separated from the fiber. The slurry containing debris called rejects is carried via line 49 to a secondary mixing tank 57. The slurry containing fiber substantially removed of debris called accepts is carried via line 50 unto vibrating screen 51. Vibrating screen 51 substantially dewaters the fiber which is then carried via line 78 to bleach tank 67. Other screening devices such as a "sidehill" screen may be substituted for a vibrating screen.

The underflow from vibrating screen 51 is carried via line 52 to collection basin 53. Collection basin 53 also accepts the overflow carried via line 54 from collection basin 76. Flow from collection basin 53 flows via line 45 to primary mixing tank 43, via line 56 to secondary mixing tank 57, and via line 55 to tertiary mixing tank 62. The level of water in collection basin 53 is relatively constant with the excess overflowing via line 24 into collection basin 22. Whenever the level of water in mixing tanks 43, 57, or 62 drops, the flow of water via lines 45, 56, and 55 respectively from collection basin 53 will increase due to the difference in hydrostatic pressure. This will halt a further decrease in water level causing the system to reach a state of hydrostatic equilibrium.

The rejects from primary hydrocyclone 48 is carried via line 49 to secondary mixing tank 57. Two other streams enter secondary mixing tank 57. One stream is carried via line 56 from collection basin 53. The other stream is accepted fiber from tertiary hydrocyclone 65 carried via line 66. The contents of secondary mixing tank 57 is carried via line 58 motivated by pump 59 into secondary hydrocyclone 60. The accepted slurry is then carried via line 44 to primary mixing tank 43. The reject slurry is then carried via line 61 to tertiary mixing tank 62.

Tertiary mixing tank 62 has another stream entering via line 55 from collection basin 53. The contents of tertiary mixing tank 62 is carried via line 63 motivated by pump 64 into tertiary hydrocyclone 65. The accepted slurry then is carried via line 66 to secondary mixing tank 57. The rejected slurry is carried via line 25 to collection basin 22.

In this manner a high percentage of fiber can be cleaned of debris with the debris concentrated in a tertiary reject stream. Less stages of hydrocyclone cleaning will result in more fiber being carried in the reject stream to collection basin 22. More stages will result in less fiber being carried in the final reject stream.

The pulp retained by vibrating screen 51 is carried via line 78 to bleaching tank 67 where bleaching chemicals are added via line 68. Effective bleaching chemicals include sodium hypochlorite and hydrogen peroxide at dosages in the range of 0.01 to 0.1 gram of active bleach chemical per gram of fiber. It is desirable to bleach under alkaline conditions with pH in the range of 9.0 to 11.5 and at a temperature in the range of 20-90 degrees C. The temperature of the bleach tank 67 is raised to the desired operating temperature by means of injection of steam via line 77. These conditions increase effectiveness of the bleach chemicals and decrease the bleach tank holding time to achieve a given degree of pulp brightness.

A mixer is provided in bleaching tank 67 to disperse the bleaching chemicals. The slurry is then carried via line 69 motivated by pump 70 to a dewatering device 71 that can be a lap pulp machine or belt press or other device that removes water from pulp without damaging the integrity of the pulp fibers. Fresh water is added via line 72 to provide a final rinse of the pulp in the drainage section of the belt press prior to the press section. The dewatered pulp then exits the machine via line 73. In lieu of fresh water, biologically treated effluent via line 34 can be pumped to dewatering device 71. In this manner, the process flow scheme discharges little or no wastewater effluent.

The water removed from the dewatering device is carried via line 74 to a collection basin 76 that is connected via line 75 to the bleaching tank 67. Excess water overflows from collection basin 76 via line 54 to collection basin 53.

A significant feature of this process invention is the countercurrent flow of process water in relation to the flow of pulp. Relatively clean excess water flows from the bleach stage to the hydrocyclone stage then from the hydrocyclone stage to the defibering stage. This feature substantially reduces fresh water consumption. Eventually water leaves the process via the biological process effluent. The biological effluent, however, can be substituted for fresh water allowing further reduction in the consumption of fresh water.

Another significant feature of this process invention is the judiciuos use of gravity flow to substantially reduce the necessity to pump process water. The lines where pumps are needed are clearly shown.

The flow relationship from the vibrating screen 18 to collection basin 22 to clarifier 29 to collection basin 16 is by gravity. Water is pumped from collection basin 16 to defibering tank 12 with the overflow flowing by gravity to biological process 32.

The flow relationships of collection basin 53 is particularly unique. The underflow from vibrating screen 51 flows by gravity to collection basin 53. Water flows by gravity to primary mixing tank 43, secondary mixing tank 57, tertiary mixing tank 62 with the overflow going to collection basin 22. This arrangement eliminates the need for several pumps.

Collection basin 76 water flows by gravity to bleach tank 67 with the overflow flowing by gravity to collection basin 53.

EXAMPLE

Considering now a specific example, dewatered paper mill sludge was obtained off of the belt press of a non-integrated fine paper mill using an approximately equal mixture by weight of hardwood and softwood bleached Kraft virgin pulps with a small percentage of secondary fiber added. The sludge was defibered at 4.75% consistency with no detergent added and was screened on a vibrating screen containing a 200 mesh screen with 57.2% of the fiber retained on the screen. Hydrocycloning was performed at 0.7% consistency with the accepts screened on a vibrating screen containing a 200 mesh screen. Bleaching was performed at 70 degrees C using sodium hypochlorite at a dosage of 0.025 g/g fiber at a pH of 10.5. Handsheet samples of as received sludge (AR) and processed sludge (PS) were then prepared according to standard procedures and the paper properties measured. These properties were compared to handsheets prepared of hardwood bleached Kraft (HWBK) and softwood bleached Kraft (SWBK) pulp. The results are given below:

|  | HWBK | SWBK | PS | AR |
| --- | --- | --- | --- | --- |
| Ash % | 0.16% | 0.16% | 0.40% | 8.1% |
| Bauer-McNett | | | | |
| (% retained on) | | | | |
| 28 Mesh | 1.1% | 60.4% | 38.0% | 18.3% |
| 48 Mesh | 50.5% | 28.1% | 37.1% | 23.4% |
| 100 Mesh | 22.6% | 5.1% | 9.7% | 7.3% |
| 200 Mesh | 9.3% | 3.0% | 5.8% | 6.4% |
| Thru 200 | 16.5% | 3.4% | 9.4% | 44.6% |
| Freeness (CSF) | 740 | 790 | 710 | 400 |
| Brightness | 84 | 80 | 77 | 47 |
| Burst (psi) | 6.5 | 20.1 | 19.8 | 10.8 |
| Tear (g) | 10.6 | 42.8 | 12.4 | 6.1 |
| Tensile (lb/in) | 7.6 | 11.3 | 14.0 | 8.7 |
| Stretch (%) | 1.05 | 2.62 | 2.32 | 1.47 |
| TEA (kg/m2) | 1.01 | 4.22 | 4.30 | 1.68 |
| ET (lb/in) | 1441 | 1562 | 1960 | 1397 |

The processing substantially improved all of the paper properties tested compared to as received paper mill sludge. Furthermore, the paper properties of the processed sludge were as a rule between that of a hardwood and softwood Kraft pulp as indicated in the Table. Exceptions were that the brightness was somewhat inferior and the tensile, TEA and ET superior.

Although the invention has been described specifically with respect to the recovery of a long fiber pulp with respect to paper mill wastewater treatment plant sludge collected by the primary clarifier at the wastewater treatment plant, it will be appreciated that the present invention is applicable to paper mill sludge that has already been dewatered or to the wastewater itself prior to entering the primary clarifier. If dewatered sludge is used in the process, the mixing energy in the defibering tank will be higher and the time needed to defiber longer. If wastewater is used, defibering is unnecessary, and the wastewater can be sent directly to the vibrating screen 18.

The invention would also apply to process water streams in the pulp or paper mill that are normally sewered because the solids are not suitable for direct recycle if captured in "saveall" devices. In this regard, the solids captured by a "saveall" device within the pulp or paper mill can be processed by means of the process invention described to make them suitable for direct recycle.

Various modifications and changes in the process of the present invention will be obvious to those skilled in the art without departing from the true spirit and scope thereof, and thus it is not intended to limit the invention except by the terms of the following claims.

What I claim is:

1. A continuous process for converting waste solids including long fibers, fiber fines, clay and random debris captured by a primary clarifier or sedimentation basin at a pulp and paper mill wastewater treatment plant into a papermaking fiber or pulp that is substantially the same quality as the papermaking fiber or pulp used by the pulp and paper mill producing the waste solids the process which comprises:
   a. defibering the waste solids in a slurry by mechanical means with chemicals added if necessary to assist in the release of individual fibers from fiber bundles;

b. screening the defibered waste solids on a vibrating screen or other screening device to separate the long fiber from the fiber fines and clay;
c. cleaning the long fibers of random debris using centrifugal cleaners;
d. bleaching the long fibers to increase brightness at elevated temperatures with addition of bleaching chemicals;
e. dewatering the long fibers to make it suitable for transportation;
f. separating fiber fines and clay in step 1b and rejected debris in step 1c from the water effluent using a coagulation process followed by a clarification process;
g. recycling the clarified water effluent in step 1f back to step 1a;
h. biologically treating the excess clarified water effluent in step 1f and discharging the treated excess water effluent from the process or recycling to step 1e as pulp wash water;
i. feeding the excess water effluent in step 1c to step 1a;
j. feeding the excess water effluent in step 1d to step 1c;
k. dewatering the fiber fines-clay-debris-biological sludge generated in steps 1f and 1h.

2. A process according to claim 1 wherein the waste solids are derived from a float of a dissolved air flotation unit located at the pulp and paper mill wastewater treatment plant.

3. A process according to claim 1 wherein the waste solids are derived from a thickening or dewatering device at the pulp and paper mill wastewater treatment plant.

4. A process according to claim 1 wherein the waste solids are derived from the wastewater emanating from the paper or pulp mill sewage system.

5. A process according to claim 1 wherein the waste solids are derived from a pulp or paper mill process water stream normally sewered.

6. A process according to claim 1 wherein the waste solids are derived from a pulp or paper mill "saveall" device and are not suitable for direct recycle.

7. A process according to claim 1 wherein sodium hypochlorite bleach is used in step 1d at dosages of 0.01 to 0.1 g/g fiber under alkaline conditions at a temperature in the range of 20 to 90 degrees Centigrade.

8. A process according to claim 1 wherein hydrogen peroxide bleach is used in step 1d at dosages of 0.01 to 0.1 g/g fiber under alkaline conditions at a temperature in the range of 20 to 90 degrees Centigrade.

* * * * *